United States Patent [19]

Whyzmuzis et al.

[11] Patent Number: 5,523,335
[45] Date of Patent: Jun. 4, 1996

[54] PRINTING INKS AND RELATED LAMINATES AND PROCESSES

[75] Inventors: Paul D. Whyzmuzis, Hatfield; Kenneth Breindel; Roger A. Lovald, both of Lansdale, all of Pa.

[73] Assignee: Henkel Corporation, Plymouth Meeting, Pa.

[21] Appl. No.: 323,646

[22] Filed: Oct. 17, 1994

[51] Int. Cl.$^6$ .................. C08K 5/15; C09D 11/00; C09D 11/14
[52] U.S. Cl. .................. 523/160; 523/161; 524/56; 524/57; 524/58; 106/19 C; 106/25 R
[58] Field of Search .................. 524/58, 56, 57; 106/25 R, 19 C; 523/160, 161

[56] References Cited

U.S. PATENT DOCUMENTS

| | | | |
|---|---|---|---|
| H603 | 3/1989 | Aveary et al. | 524/56 |
| 3,377,303 | 4/1968 | Peerman et al. | 260/18 |
| 3,654,261 | 4/1972 | Johnson et al. | 260/210 |
| 3,900,436 | 8/1975 | Drawert et al. | 260/18 N |
| 4,148,779 | 4/1979 | Blackwell et al. | 160/40 |
| 4,617,343 | 10/1986 | Walker et al. | 524/817 |
| 4,657,999 | 4/1987 | Hoefer et al. | 526/200 |
| 4,673,727 | 6/1987 | Miller, Jr. | 528/295.5 |
| 4,781,725 | 11/1988 | Dunn, Jr. et al. | 8/471 |
| 4,820,765 | 4/1989 | Whyzmuzis | 524/606 |
| 4,895,888 | 1/1990 | Keaveney | 524/391 |
| 4,913,969 | 4/1990 | Schulte et al. | 428/420 |
| 4,921,899 | 5/1990 | Phan et al. | 524/513 |
| 4,973,617 | 11/1990 | Incontro et al. | 524/187 |
| 4,980,408 | 12/1990 | Chan | 524/504 |
| 5,043,245 | 8/1991 | Vermeulen et al. | 430/247 |
| 5,075,364 | 12/1991 | Phan et al. | 524/190 |
| 5,154,760 | 10/1992 | Miller, Jr. | 106/20 |
| 5,178,951 | 1/1993 | Kono et al. | 428/426 |
| 5,183,847 | 2/1993 | El-Hefnawi et al. | 525/54.44 |
| 5,338,785 | 8/1994 | Catena et al. | |
| 5,340,394 | 8/1994 | Elsamanoudi | 106/500 |
| 5,373,045 | 12/1994 | Smith et al. | 524/385 |
| 5,393,650 | 2/1995 | Bagchi et al. | 430/523 |

FOREIGN PATENT DOCUMENTS

| | | |
|---|---|---|
| 5016299 | 1/1993 | Japan . |
| 5331403 | 12/1993 | Japan . |
| WO92/22606 | 12/1992 | WIPO . |

OTHER PUBLICATIONS

T. Sulzzberg, "Printing Ink Vehicles", *Encyclopedia of Polymer Science and Engineering*, vol. 13, pp. 368–398, John Wiley & Sons, New York, NY, 1988.
B. Kine, "Acrylic and Methacrylic Ester Polymers", *Encyclopedia of Polymer Science and Engineering*, vol. 1, pp. 234–299, John Wiley & Sons, New York, NY, 1985.
D. James, "Styrene Polymers", *Encyclopedia of Polymer Science and Engineering*, vol. 16, pp. 1–21, John Wiley & Sons, New York, NY, 1989.
Poehlein, "Emulsion Polymerization", *Encyclopedia of Polymer Science and Engineering*, vol. 6, pp. 1–51, John Wiley & Sons, New York, NY, 1986.
S. Temin, "Adhesive Compositions", *Encyclopedia of Polymer Science and Engineering*, vol. 1, pp. 547–577, John Wiley & Sons, New York, NY, 1981.
F. McGarry, "Laminated and Reinforced Plastics", *Encyclopedia of Chemical Technology*, Third Edition, vol. 13, pp. 968–978, John Wiley & Sons, New York, NY 1981.

*Primary Examiner*—Tae Yoon
*Attorney, Agent, or Firm*—Ernest G. Szoke; Wayne C. Jaeschke; J. Daniel Wood

[57] ABSTRACT

A flexible packaging printing ink is formulated from a resin binder (e.g. an alcohol soluble polyamide or a water-dispersible polyacrylate), pigment, solvent (e.g. a lower alkanol or water), and an alkyl polyglycoside surfactant. Related methods, compositions and articles are also provided. A method of preparing a polyamide resin by condensing a dibasic acid mixture with a diamine mixture and melt blending the resin with an alkyl polyglycoside is also provided. These polymers are particularly useful as the binder for a flexible packaging laminating ink composition.

16 Claims, No Drawings

PRINTING INKS AND RELATED LAMINATES AND PROCESSES

FIELD OF THE INVENTION

The present invention relates to printing inks and, in particular, to their use in manufacturing printed laminates. More particularly, it relates to printing inks comprised of a resin binder, a pigment, a solvent and a particular functional additive. This invention also relates to laminates manufactured using such inks and to related processes and methods.

BACKGROUND OF THE INVENTION

Flexible packaging printing inks are typically printed by rotary letterpress printing using flexible rubber plates or by gravure printing using engraved chrome-plated cylinders on a wide variety of substrates, e.g. plastic films such as cellulose acetate, polyethylene, polyethylene terephthalate, polyesters, polystyrene, cellophane, glassine, tissue, aluminum foils, liners, bags, paper labels, box coverings, gift wrappings, etc.

Flexible packaging printing inks are widely used in the graphic arts industry. They offer economy, versatility; quality and simplicity and permit a roll of material to be multi-color printed in a continuous web at speeds of over 300 meters per minute and feed it directly to converting machines for slitting, forming or laminating. However, these inks must be carefully formulated so as to avoid the problems indigenous to these types of inks, e.g. chemical pinholing (failure of the ink to properly wet a plastic film surface), mechanical pinholing (the appearance of the pattern of the etched ink form roller), feathering (the appearance of stringy or ragged edges), mottle (ridged or speckled patterns), precipitation of part of the vehicle, blocking (a sticking or transfer of the image to the underside of the web), adhesion of the ink to the substrate, etc.

U.S. Pat. No. 5,338,785 (Catena et al.) discloses a flexible packaging printing ink is formulated from a copolymer of polyethylenene glycol methacrylate and a polyamide resin, pigment, solvent and cellulose acetate butyrate. The polyamide resin is prepared by condensing a dibasic acid mixture with a diamine mixture. The dibasic acid mixture comprises about 0.5 to 0.8 equivalents of a $C_{20}$–$C_{44}$ dibasic acid mixture comprised of about 60 to 100% dimers, 0 to 40% trimers and 0 to 5% monomers, and about 0.2–0.7 equivalents of at least one $C_6$–$C_{12}$ dibasic acid such as azelaic acid and adipic acid, while the diamine mixture comprises about 0.5–0.8 equivalents of piperazine or a substituted piperazine and the balance comprises at least one $C_2$–$C_{12}$ alkyl diamine such as ethylene diamine.

The use of acrylate ester polymers as printing ink vehicles is generally discussed in "Printing Ink Vehicles", *Encyclopedia of Polymer Science and Engineering*, vol. 13, pp. 368–398 (John Wiley & Sons, Inc. N.Y., N.Y., 1988). For example, at page 393, it is stated that while acrylis and methacrylic ester resins are used in water-based systems, several problems still exist, for example balancing water solubility in the ink and water resistance in the end product.

U.S. Pat. No. 5,075,364 (Phan et. al.) discloses a blend of a water-dissipatable polyester material, an acrylic polymer and a water-dissipatable vinyl polymer. It is stated that the acrylic polymer and the vinyl polymer must be compatible with the polyester which has a particular composition. It is stated that the polymer blends are useful for preparing ink compositions having improved block resistance, water resistance, and alcohol resistance.

U.S. Pat. No. 4,921,899 discloses an ink composition containing a blend of a polyester, an acrylic polymer and a vinyl polymer. The water-based inks containing the blend of these polymers as a binder can significantly improve ink film properties such as alcohol resistance, block resistance and water resistance as compared to use of water-dispersible polyester alone. The polymer blends were also employed to prepare ink primers and overprint varnishes. It is stated that these polymer blends were prepared by mixing an aqueous polyester dispersion with an acrylic emulsion which contains surfactants and other additives and that the presence of surfactants in the ink formulations creates several problems related to ink stability, printing process and print quality of the ink film.

SUMMARY OF THE INVENTION

This invention relates to a composition useful in preparing printing inks comprising a major amount of a binder resin selected from the group consisting of a thermoplastic resin that is soluble or dispersible in a member selected from the group consisting of water and lower alkanols and a minor amount of an alkyl polyglycoside surfactant. The minor amount will typically be effective in improving the strength of a bond of the binder resin to a printed substrate.

The present invention also relates to flexible packaging printing inks comprising: (a) a binder resin selected from the group consisting of a thermoplastic resin that is soluble or dispersible in a member selected from the group consisting of water and lower alkanols, (b) a pigment; (c) a solvent; and (d) an alkyl polyglycoside surfactant.

This invention also relates to a method of coating a substrate comprising (i) contacting a surface of a substrate with a composition comprising an ink as defined above, and (ii) drying said surface to form a film of the solids of said ink in contact with said surface.

This invention also relates to a method of preparing a laminate comprising depositing a solution of an adhesive on said coated surface (preferably a fusible adhesive in a solvent or in an aqueous emulsion followed by drying solvent or water from said adhesive), and pressing another substrate on said adhesive under conditions of elevated temperature sufficient to activate said adhesive.

This invention also relates to a laminate comprising a first substrate in contact with an ink layer comprising a binder resin, a pigment, and an alkyl polyglycoside surfactant and a second substrate in contact with an adhesive layer, wherein at least a portion of said ink layer and said adhesive layer are in contact sufficient to secure at least a portion of said first and second substrates in a fixed relation.

This invention also relates to a method of preparing a polyamide binder resin comprising condensing a dibasic acid mixture with a diamine mixture, the equivalents of said dibasic acid mixture being essentially equal to the equivalents of said diamine mixture (e.g. a ratio of from 1.1:1 to 0.9:1), said dibasic acid mixture comprising (i) a $C_{20}$–$C_{44}$ dibasic acid mixture comprised of about 60–100% dimers, 0–40% trimers and 0–5% monomers (preferably about 0.5–0.8 equivalents of said $C_{-20}$ to $C_{44}$ dibasic acid), and (ii) at least one $C_6$–$C_{12}$ dibasic acid (preferably about 0.2–0.7 equivalents), said diamine mixture comprising piperazine or a substituted piperazine (preferably about 0.5–0.8 equivalents) and the balance comprising at least one $C_2$–$C_{12}$ alkyl diamine and melt blending said polyamide resin with a minor amount of an alkyl polyglycoside surfactant.

In another embodiment, the binder resin is preferably a water dispersible acrylate resin prepared by the suspension polymerization of one or more monomers selected from the group consisting of alkyl acrylates, alkyl methacrylates, and mixtures of a major amount by weight of an alkyl acrylate or alkyl methacrylate with a minor amount by weight of one or more copolymerizable comonomers, in the presence of a support resin, to which the alkyl polyglycoside is added after said suspension polymerization.

DETAILED DESCRIPTION OF THE INVENTION

One component of the inks of this invention is an alkyl polyglycoside surfactant. Such compounds can be represented by the formula I:

$$R\!-\!O(\!-\!G)_n$$

wherein R is an alkyl group having from about 8 to about 22 carbon atoms, G is a saccharide residue having 5 or 6 carbon atoms; and n is a number from greater than 1, e.g. from 1.6 to about 10. Compounds of the formula I are commercial surfactants and are available, for example, from Henkel Corporation, Ambler, Pa., 19002 under the trademark names APG®, Plantaren™, or Glucopon™. Examples of such surfactants include but are not limited to:

1. Glucopon™ 225—an alkylpolyglycoside in which the alkyl group contains 8 to 10 carbon atoms.
2. APG® 325—an alkyl polyglycoside in which the alkyl group contains 9 to 11 carbon atoms.
3. Glucopon™ 625—an alkyl polyglycoside in which the alkyl groups contains 12 to 16 carbon atoms.
4. APG® 300—an alkyl polyglycoside substantially the same as the 325 product above but having a different average degree of polymerization.
5. Glucopon™ 600—an alkylpolyglycoside substantially the same as the 625 product above but having a different average degree of polymerization.
6. Plantaren® 2000—a $C_{8\text{-}16}$ alkyl polyglycoside.
7. Plantaren® 1300—a $C_{12\text{-}16}$ alkyl polyglycoside.
8. Plantaren® 1200—a $C_{12\text{-}16}$ alkyl polyglycoside.

Other examples include alkyl polyglycoside surfactant compositions which are comprised of mixtures of compounds of formula IV wherein G represents a moiety derived from a reducing saccharide containing 5 or 6 carbon atoms; n is a number from 1.1 to 3; and R is an alkyl radical having from 8 to 20 carbon atoms. The composition is characterized in that it has increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and poly-glycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in copending application Ser. No. 07/810,588, filed on Dec. 19, 1991, the entire contents of which are incorporated herein by reference. The skilled artisan may find it beneficial to use a mixture of compounds of the formula. The preferred compounds of formula I are Glucopon™ 425 surfactant and Glucopon™ 625 surfactant.

An effective amount of a compound of formula I is any amount which will increase the bond strength of the ink to the printed substrate. The effective amount will typically be in the range of an amount alkyl polyglycoside surfactant as a percentage of the sum of the weights of binder resin and alkyl polyglycoside surfactant from about 0.1% to about 10%, more typically from about 1% to about 5%.

The preferred binder resins used in the printing inks of this invention can be broadly divided into two separate categories, i.e. alcohol soluble polyamide resins and water-dispersible polyacrylate resins, each of which will be discussed in turn and in more detail below.

The polyamide resin can be mixed with the alkyl polyglycoside surfactant. Examples of useful polyamide resins include those disclosed in, for example, U.S. Pat. No. 3,377,303 and U.S. Pat. No. 5,154,760, the disclosures of which are incorporated herein by reference thereto. The polyamide composition of the present invention can be prepared by standard condensation reactions known to those in the art. For example, the polyamide composition of the invention can be prepared by reacting the acid components with the amine components optionally in the presence of a catalyst such as phosphoric acid at a condensation temperature generally in the range from 150° to 250° C. until the reaction is completed. The order of addition of the reactants is not critical. In preferred embodiments, the alkyl polyglycoside is melt blended with the resin immediately after the condensation thereof to prepare a homogeneous blend of polyamide resin and alkyl polyglycoside.

Examples of useful $C_{20}\text{-}C_{44}$ dibasic acid mixtures are soya-derived fatty acids and tall oil-derived fatty acids. Examples of useful $C_6\text{-}C_{12}$ dibasic acids include adipic, pimelic, suberic, azelaic, sebacic, etc. Examples of useful $C_2\text{-}C_{12}$ alkyl diamines include ethylene diamine, propylene diamine, piperazine, diethylene diamine, substituted piperazines such as 1,4-bis(3-aminopropyl)piperazine and dipiperazyl alkanes, etc. Preferably, the polyamide resin is one wherein: the $C_{20}\text{-}C_{44}$ dibasic acid mixture is present in an amount of 0.6–0.7 equivalents; the $C_{20}\text{-}C_{44}$ dibasic acid mixture comprises dimers, trimers and monomers of a $C_{36}$ dibasic acid; the $C_6\text{-}C_{12}$ dibasic acid comprises 0.25–0.28 equivalents of azelaic acid and 0.0–0.08 equivalents of adipic acid; and the diamine mixture comprises 0.60–0.80 equivalents of piperazine with the balance comprising ethylene diamine. The polyamide resins will typically have weight average molecular weights in the range of 40,000 to 60,000.

The polyamide resins can have physical properties that render them especially useful for laminating ink resin binders. In particular, the polyamide resin compositions of the invention have good ethanol solubility and reducibility, good viscosity stability and good softening points as well as possessing other desirable properties.

Suitable alcohol solvents include the short chain aliphatic alcohols having from 2 to 4 carbon atoms, e.g. the lower alkanols, ethanol, n-propanol, isopropanol and n-butanol. Preferred solvents are n-propanol and a mixture of n-propanol and n-propyl acetate (the ratio of n-propanol to n-propyl acetate is typically in the range of 1:1 to 10:1 by weight). The solvent is typically employed in an amount of about 35–50 wt. %, preferably 40–45 wt. %, based on the weight of the ink.

The binder resin of this invention may also be an acrylate polymer. These polymers have repeating units derived from esters of acrylic acid and methacrylic acid. Such esters are described in "Acrylic and Methacrylic Ester Polymers", *Encyclopedia of Polymer Science and Engineering*, vol. 1, pp. 234–299 (John Wiley & Sons, Inc., N.Y., N.Y., 1985), the disclosure of which is incorporated herein by reference. The polymer may also have repeating units derived from other monomers including, without limitation, ethylenically unsaturated carboxylic acids and vinyl aromatic monomer. Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989) and examples of such acids are described in "Acrylic and Methacrylic Acid Polymers", *Encyclopedia of Polymer Science and Engineering*, vol. 1, pp. 211–234 (John Wiley & Sons, Inc., N.Y., N.Y., 1985), the disclosures of which are incorporated herein by reference.

Examples of acrylates and methacrylates that should be useful include methyl, ethyl, n-propyl, isopropyl, n-butyl, isobutyl, sec-butyl, n-amyl, isoamyl, t-amyl, n-hexyl, 2-ethylbutyl, cyclohexyl, 2-heptyl, n-octyl, 2-ethylhexyl, n-decyl, and n-undecyl. A potential utility of such monomers is the ability of one of ordinary skill, in possession of this disclosure, to use such monomers to optimize the softness of the polymer. Thus, one measure of their utility will depend upon the desired degree of softness of the polymer which, in turn, depends at least in part, on the identity and amounts of the other monomeric units. A measure of the softening or plasticizing effect of a monomer can be found by examining the glass transition temperature of a homopolymer of the monomer. Generally, a plasticizing monomer will be such that a homopolymer of the monomer will exhibit a glass transition temperature ($T_g$) of less than about −30° C. Thus, acrylates of a straight chain alkyl having from 3 to 11 carbon atoms or a branched chain alkyl having from 5 to 11 carbon atoms may generally be useful for plasticizing the polymer. Because of the relatively high $T_g$ of poly(t-butyl acrylate), the use of a monomer t-butyl acrylate is unlikely to be advantageous.

Vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of metamethylstyrene and para-methylstyrene), meta-methylstyrene, paramethylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene.

Further, while the preferred alkyl acrylates and methacrylates described above are preferably employed without additional comonomers for preparing ink vehicles of this invention, other monoethylenically unsaturated polymerizable monomers useful in minor proportion (e.g. less than 10% by weight of the total monomer composition) as comonomers with acrylic monomers may be useful in preparing the polymers of this invention, particularly for uses other than in ink vehicles. These monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like.

Additional monoethylenically unsaturated polymerizable comonomers that may be useful in preparing the polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the polymer.

Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof.

The preparation of aqueous dispersions of polymers by emulsion polymerization for use in coatings applications is well known in the art. The practice of emulsion polymerization is discussed in detail in G. Poehlein, "Emulsion Polymerization", *Encyclopedia of Polymer Science and Technology*, vol. 6, pp. 1–51 (John Wiley & Sons, Inc. N.Y., N.Y., 1986), the disclosure of which is incorporated herein by reference. Conventional emulsion polymerization techniques may be used to prepare the aqueous dispersion of polymers of this invention.

Thus, monomers may be emulsified with an anionic, cationic or nonionic dispersing agent, using for example from about 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Cationic dispersion agents include lauryl-pyridinium chlorides, cetyldimethyl amine acetate, and alkyldimethylbenzylammonium chlorides in which the alkyl group has from 8 to 18 carbon atoms. Anionic dispersing agents include, for example, the higher fatty alcohol sulfates, such as sodium lauryl sulfate, and the like; alkylaryl sulfonates such as sodium or potassium isopropylbenzene sulfonates or isopropyl naphthalene sulfonates, and the like;

alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

In addition to the emulsifiers set forth above, the emulsion may contain one or more suspending aids. Preferred compositions contain an acrylic resin having a substantial acid number as a suspending aid. Such resins become and contribute to the polymer film prepared from the emulsion, but do not have acceptable properties by themselves.

Preferred carboxylate polymers are vinyl aromatic/acrylic copolymers (e. g. styrene/acrylic copolymers) having a substantial acid number (typically 150–250, and preferably 180–220) and a moderate molecular weight (e.g. 6,000 to 10,000). Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989), the disclosure of which is incorporated herein by reference. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of metamethylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene. At least a portion of the acrylic units of the polymer will bear free carboxyl or carboxylate groups (the carboxyl or carboxylate form depending upon the pH of the aqueous emulsion). This carboxylate functionality is solvated by the aqueous polymerization medium and, thus, contributes to the stability of the polymer suspension. The aqueous composition should be essentially free of species which can react with or form a complex with such carboxylate functionality. Such freedom will ensure that the carboxylate functionality remains solvated by the aqueous polymerization medium and/or that the carboxylate polymer will not engage in measurable crosslinking, either in the aqueous polymerization medium or the films prepared therewith. Also, emulsion stabilizers, i.e. water soluble polymers such as water-soluble polyalkylene oxides, may be useful. A preferred emulsion stabilizer is a polypropylene glycol having a molecular weight in the range of 1,000 to 1,500.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows. The colorant is added to the binder resin or a solution or dispersion thereof and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill at about 220° F. to 360° F. (104.44° C. to 182.22° C.) and using processing aids as desired, such as solvents or plasticizers. The viscosity and printing characteristics of the ink composition may be modified further by addition of water, solvents, plasticizers, sequestered wax, surfactants and the like to suit the particular printing needs.

The ink compositions of the present invention are not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

The printing processes most advantageously used with the inks or varnishes are the flexographic and/or gravure printing processes. One characteristic of such printing processes, is that the aqueous dispersion of ink or varnish is supplied to said surface by a hydrophilic cylindrical transfer roll. Printing processes are described by T. Sulzberg et al., "Printing Ink Vehicles", *Encyclopedia of Polymer Science and Engineering,* vol. 13, pp. 368–398 (John Wiley & Sons, Inc., N.Y, N.Y., 1988), the disclosure of which is incorporated herein by reference. Thus, this invention relates to a method of printing comprising applying a first portion of an aqueous dispersion comprised of the polymer of this invention to a first essentially impervious printing surface, said surface having recesses therein which define a resolvable image, contacting said surface with a printable substrate, and repeating said applying and said contacting with a second portion of said aqueous dispersion and a second printable surface. This method may be a letterpress printing method (wherein said recesses define raised portions of the surface which carry the aqueous dispersion to the substrate, e.g. flexography) or a gravure printing method (wherein said recesses carry the aqueous dispersion to the substrate). In flexographic printing in particular, an aqueous dispersion comprised of the polymer of this invention is applied to a flexible plate mounted on a plate cylinder. The flexible plate is then contacted with a printable substrate by rotation of the plate cylinder. In preferred embodiments, the aqueous dispersion is applied to the flexible plate with a cylindrical transfer roll which is rotated to successively take up and then apply successive portions of the aqueous dispersion.

Also provided by this invention is a printing ink comprising solvent, the resin binder, the alkyl polyglycoside surfactant and a colorant distributed through the composition in an effective amount sufficient to impart a predetermined color to the resulting composition.

Thus, another ingredient of the printing ink of this invention is the colorant. The generic term colorant is specifically used in this specification in that it is intended to refer to both pigments and dyes which impart a distinct color to the composition. The purpose of any colorant is to provide contrast between the color of the substrate and the color of ink in order to provide a visually identifiable indicia on the substrate.

The pigment may be any of those which are typically used in flexographic inks such as monoazo yellows (e.g. CI Pigment Yellows 3, 5, 98); diarylide yellows (e.g. CI Pigment Yellows 12, 13, 14); Pyrazolone Orange, Permanent Red 2G, Lithol Rubine 4B, Rubine 2B, Red Lake C, Lithol Red, Permanent Red R, Phthalocyanine Green, Phthalocyanine Blue, Permanent Violet, titanium dioxide, carbon black, etc. The pigment is employed in amounts of about 10–45 wt. %, preferably 15–40 wt. %, based on the weight of the ink.

The laminates of the present invention may contain laminae of a wide variety of flexible materials. Thus, suitable; laminae include films of polyethylene and polypropylene generally treated for adhesion promotion; also polyester such as polyethylene terephthalate, cellophane and polyamide which may or may not be coated with PVDC for improved barrier properties. Preferably, dissimilar laminae are used where films, for example, of corona treated polypropylene or polyethylene are bonded to polyester, polyamide or PVDC coated cellophane or PVDC coated polyester, or paper. Also contemplated within the present invention are laminates prepared with woven and non-woven fabrics where the fibers are of cotton, polyester, polyolefin, polyamide, polyimide and the like; metallic foils such as aluminum foil; metallized films; paper and paperboard; and cellular flexible sheet material such as polyethylene foam, polyurethane foam and sponge and foam rubber.

In general, at least one of the laminae will be translucent to visible light and, more typically, transparent. Such translucency or transparency will allow the colorant to present a hue and or resolvable image through that substrate. The other laminate may also be translucent or transparent, but need not be, for example, when an opaque inner liner is desired.

In the preferred embodiment wherein one of the laminae is a printed surface, any of the conventionally used solvent-borne or aqueous adhesives may be employed in the printing process. Adhesives are discussed in "Adhesive Compositions", *Encyclopedia of Polymer Science and Engineering,* vol. 1, pp. 547–577 (John Wiley & Sons, Inc. N.Y., N.Y., 1985), the disclosure of which is incorporated by reference. As a solvent-borne adhesive, a moisture curable polyurethane in a polar organic solvent is typically used. As an aqueous adhesive, an aqueous emulsion of a flexible adhesive polymer is typically used.

In forming the laminates of the present invention, conventional techniques known per se are employed to apply the adhesive to the film substrate. Thus, these adhesives may be applied by use of any mechanical coating process such as air knife, trailing blade, knife coater, reverse roll or gravure coating technique. Most commonly, the adhesive is coated over the ink on the substrate and allowed to dry. A second substrate is then applied to the adhesive layer under conditions of elevated temperature which activate the adhesive while in contact with the substrate, for example, a corona treated polyethylene or polypropylene film or other lamina.

The following examples will serve to further illustrate the invention, but should not be construed to limit the invention, unless expressly set forth in the appended claims. All parts, percentages, and ratios are by weight unless otherwise indicated in context.

EXAMPLES

Example 1

A polyamide resin was prepared in a resin kettle from a mixture of dibasic acids and diamines as follows. The dibasic acid mixture was 51.23 eq. % dimer acid, available from Henkel Corp., Ambler, Penn., as VERSADYME 288, 3.27 eq.% trimer acid available from Henkel Corp. as VERSATRYME 213, and 45.50 eq. % of azelaic acid. The diamine mixture was 25.5 eq. % ethylenediamine and 74.5% piperazineo The ratio of total acid equivalents to total amine equivalents was 0.9677:1, respectively. The mixture, which also contained 3–7 drops of phosphoric acid catalyst and 5–10 drops of an anti-foam, was heated to 225° C. under nitrogen sparge over a period of about 1.5 to 2 hours. After about 1.5 hours at 225° C., a vacuum of about 40 mm of Hg was applied for about one hour. Vacuum was then broken, the mixture was allowed to cool slightly and 3% by weight of GLUCOPON™ 425 CS was added slowly. The mixture was heated back up and held for about one hour until discharge from the resin kettle as a clear melt.

The blend was made into a varnish by dissolving 5 parts by weight of blend in 20 parts by weight of n-propanol. The varnish was applied to a polyester film substrate, overcoated with a moisture curable polyurethane laminating adhesive available from Morton International, Chicago, Ill., as ADCOTE 333. A second substrate was applied over the adhesive shortly after overcoating thereof and heat was applied to the polyester substrate (about 93° C.) with pressure to bond the resulting laminate.

Example 2

The procedure of Example 1 was repeated with minor variations in times and pressures and with the mixture of dibasic acid and diamines as follows. The dibasic acid mixture was 52 eq. % dimer acid, available from Henkel Corp. as VERSADYME 288, 2 eq. % trimer acid available from Henkel Corp. as VERSATRYME 213, and 46 eq. % of azelaic acid. The diamine mixture was 25 eq. % ethylenediamine and 75% piperazine. The ratio of total amine equivalents to total acid equivalents was 0.969:1, respectively.

Example 3

An aqueous ink was prepared by blending 30 parts by weight of a pigment dispersion with 62 parts by weight of a resin blend and 8 parts by weight of water. The resin blend was 95 parts by weight of an acrylate emulsion available from Henkel Corp. as G-CRYL 1200 and 5 parts by weight of GLUCOPON™ 425 CS. The ink was applied to a polyester film, overcoated with a water-based laminating adhesive, available as DURO-FLEX 5050, from National Starch and Chemical Corp., Bridgewater, N.J. The adhesive was allowed to dry and a polyethylene film was applied thereover. Heat was then applied to the polyester substrate (about 93° C.) with pressure to bond the resulting laminate.

What is claimed is:

1. A composition useful in preparing printing inks comprising a major amount of an alcohol-soluble polyamide and a minor amount of an alkyl polyglycoside surfactant.

2. A composition as claimed in claim 1 wherein said minor amount is effective to increase the strength of a bond of the alcohol soluble polyamide to a printed substrate.

3. A composition as claimed in claim 1 wherein said alkyl polyglycoside has the formula I:

$$R-O(-G)_n$$

wherein R is an alkyl group having from 8 to 22 carbon atoms, G is a saccharide residue having 5 or 6 carbon atoms; and n is a number from just greater than 1 to about 10.

4. A composition as claimed in claim 3 wherein n is at least 1.6.

5. A composition of claim 3 wherein in said compound of formula I, R is an alkyl group having from 8 to 22 carbon atoms, G is a glucose residue and n is from 1.6 to 3.

6. A composition of claim 3 wherein in said compound of formula I, R is a $C_{8-16}$ alkyl group, G is a glucose residue, and n is 1.6.

7. A composition of claim 3 wherein in said compound of formula I, R is a $C_{12-16}$ alkyl group, G is a glucose residue, and n is 1.6.

8. A composition as claimed in claim 1 further comprising a pigment and a solvent selected from the group consisting of lower alkanols.

9. A composition as claimed in claim 1 wherein said alcohol-soluble polyamide is the product of condensing a dibasic acid mixture with a diamine mixture, said dibasic acid mixture comprising (i) a $C_{20}$–$C_{44}$ dibasic acid mixture comprised of about 60–100% dimers, 0–40% trimers and 0–5% monomers, and (ii) at least one $C_6$–$C_{12}$ dibasic acid, said diamine mixture comprising piperazine and the balance comprising at least one $C_2$–$C_{12}$ alkyl diamine.

10. A composition as claimed in claim 9 wherein said polyamide resin has a weight average molecular weight in the range of 40,000 to 60,000 and is prepared by the condensation of a dibasic acid mixture with a diamine mixture, said dibasic acid mixture comprises: (i) about 0.5–0.8 equivalents of a $C_{20}$–$C_{44}$ dibasic acid mixture comprised of about 60–100% dimers, 0–40% trimers and 0–5% monomers, and (ii) about 0.2–0.7 equivalents of at least one $C_6$–$C_{12}$ dibasic acid, said diamine mixture comprises about 0.5–0.8 equivalents of piperazine and the balance comprises at least one $C_2$–$C_{12}$ alkyl diamine.

11. A composition as claimed in claim 9 wherein said minor amount is about 1–5 wt. % based on the total weight of said alcohol-soluble polyamide and alkylpolyglycoside.

12. A composition as claimed in claim 9 wherein the $C_{20}$–$C_{44}$ dibasic acid mixture comprises dimers, trimers and monomers of a $C_{36}$ dibasic acid.

13. A composition as claimed in claim 9 wherein the diamine mixture comprises 0.60–0.80 equivalents of piperazine with the balance comprising ethylene diamine.

14. A composition useful in preparing printing inks comprising a major amount of (a) an alcohol-soluble polyamide said alcohol-soluble polyamide being the product of condensing a dibasic acid mixture with a diamine mixture, said dibasic acid mixture comprising (i) a $C_{20}$–$C_{44}$ dibasic acid mixture comprised of about 60–100% dimers, 0–40% trimers and 0–5% monomers, and (ii) at least one $C_6$–$C_{12}$ dibasic acid, said diamine mixture comprising piperazine and the balance comprising at least one $C_2$–$C_{12}$ alkyl diamine, and (b) an alkyl polyglycoside surfactant having the formula:

$$R-O(-G)_n$$

wherein R is an alkyl group having from 8 to 22 carbon atoms, G is a glucose residue and n is from 1.6 to 3 wherein said alkyl polyglcoside is present in an amount of about 1–5 wt % based on the total weight of said alcohol-soluble polyamide and alkyl polyglycoside.

15. A composition as claimed in claim 14 wherein said polyamide resin has a weight average molecular weight in the range of 40,000 to 60,000 and is prepared by the condensation of a dibasic acid mixture with a diamine mixture, said dibasic acid mixture comprises: (i) about 0.5–0.8 equivalents of a $C_{20}$–$C_{44}$ dibasic acid mixture comprised of about 60–100% dimers, 0–40% trimers and 0–5% monomers, and (ii) about 0.2–0.7 equivalents of at least one $C_6$–$C_{12}$ dibasic acid, said diamine mixture comprises about 0.5–0.8 equivalents of piperazine and the balance comprises at least one $C_2$–$C_{12}$ alkyl diamine.

16. A composition as claimed in claim 15 further comprising a pigment and a solvent selected from the group consisting of lower alkanols.

\* \* \* \* \*

UNITED STATES PATENT AND TRADEMARK OFFICE
CERTIFICATE OF CORRECTION

PATENT NO. : 5,523,335
DATED : June 4, 1996
INVENTOR(S) : Whyzmuzis et al.

It is certified that error appears in the above-identified patent and that said Letters Patent is hereby corrected as shown below:

In col 5, line 53, please delete "moleties" and please insert --moieties--.
In col 7, line 51, please delete "moleties" and please insert --moieties--.
In col 11, line 6, please delete "piperazineo" and please insert --piperazine.--.

Signed and Sealed this

Sixth Day of January, 1998

Attest:

Attesting Officer

BRUCE LEHMAN
Commissioner of Patents and Trademarks